Patented Apr. 3, 1928.

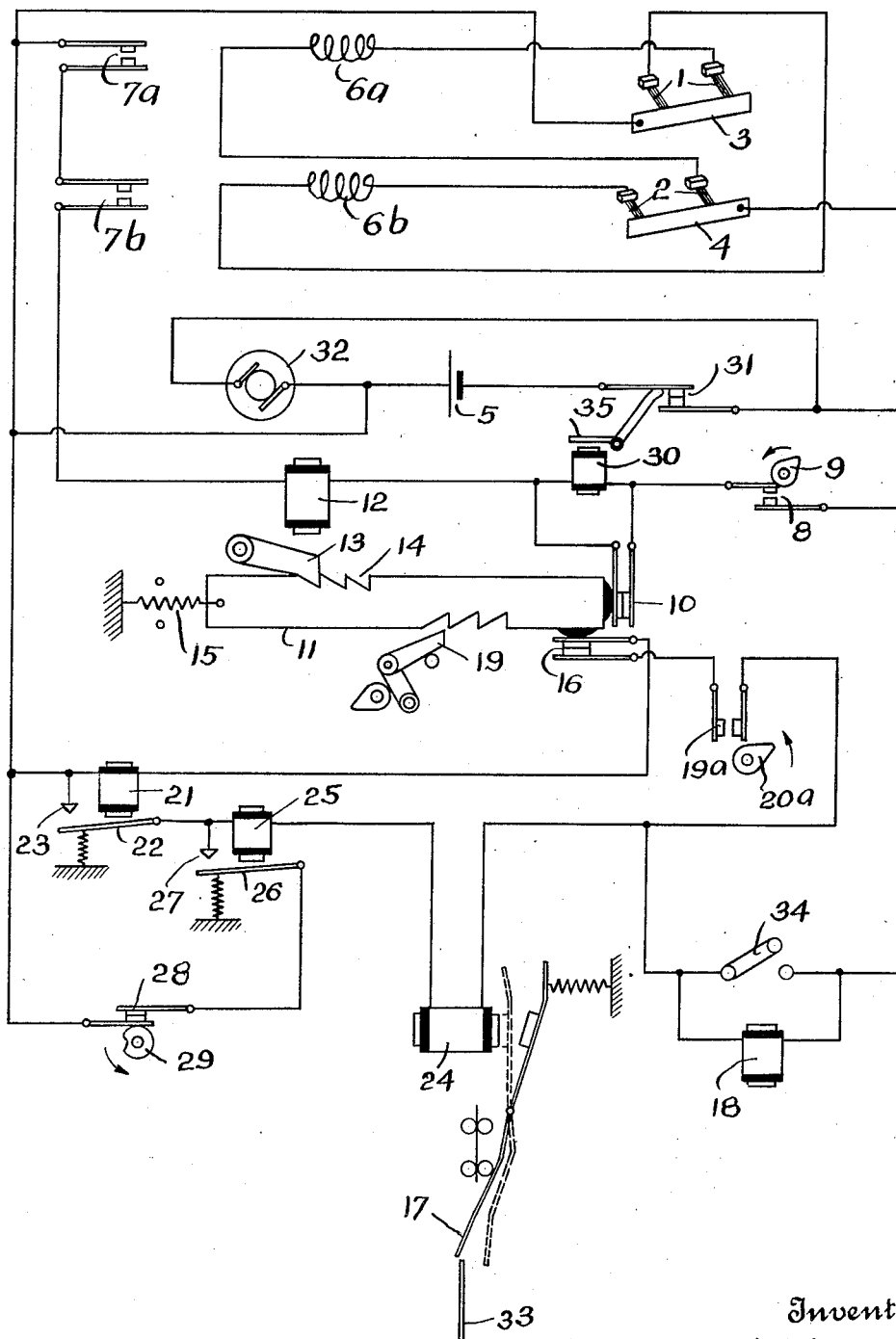

1,664,533

UNITED STATES PATENT OFFICE.

HERMANN ADALBERT WEINLICH, OF BERLIN, GERMANY, ASSIGNOR TO THE TABULATING MACHINE COMPANY, OF ENDICOTT, NEW YORK, A CORPORATION OF NEW JERSEY.

MACHINE FOR COMPARING PUNCHED CARDS.

Application filed December 24, 1926, Serial No. 156,977, and in Germany June 10, 1926.

This invention relates to improvements in tabulating and like machines controlled by means of punched cards.

In recording commercial transactions on cards by punching holes therein for use in tabulating machines it is usually customary to make one punched card for each business transaction. However, in some classes of business the control of the business requires two cards for one transaction, for example, one card may record the facts of a given order and another card the facts of the execution of the order. In such cases it is important to be able to separate the cards which are existing in alike pairs and therefor indicating executed orders, from the other single cards which correspond to orders which have not been executed. Such requirements in big commercial institutions require considerable manual sorting of the cards requiring the employment of a number of persons.

By the use of a special control member in conjunction with a tabulating machine or sorting machine the punched cards of the general type above can be compared and by coordinating the special control mechanisms with the sensing devices for the card holes, these cards may be made to control either a data registering device or sorting device, according to whether it is desired to print the data on the cards existing in pairs or merely separate them from those existing singly.

Through inadvertence the same card may be made twice for the same commercial transaction. The machine control mechanism according to the present invention is designed to bring this to the attention of the operator by automatically stopping the machine.

It is an object of this invention to provide means for comparing successive records to distinguish sets consisting of a predetermined number of records from sets consisting of more or less than the predetermined number.

Another object of the invention is to provide means for comparing successive pairs of cards of identical records in such a machine to distinguish them from single cards of different records.

A further object of the invention is to provide a machine of this class having provisions for comparing successive records to distinguish sets consisting of a predetermined number of records from sets of a lesser number of records or from single records and provide for the control of certain record responsive devices which will be responsive to one card only in any one set and be unresponsive to all others in that set.

A still further object of the invention is to provide a machine of this class having provisions for comparing successive records to indicate more than a predetermined number of like records.

A still further object is to provide a machine of this class having provisions for comparing successive records and to further provide for stopping the machine when a given number of like successive records is exceeded.

The single figure in the drawing shows substantially and diagrammatically the invention in connection with a known type of tabulating machine of the punched card type.

Referring to the drawing two sets of analyzing brushes are shown at 1 and 2, brushes 1 conforming generally to the control brushes and brushes 2 to the reading brushes of a tabulating machine, although as will appear later these brushes have additional functions not heretofore present in machines of this type. Each set of brushes consists of two brushes 1 and 2, the sets of brushes having coordinated thereto contact blocks 3 and 4 respectively. The cards to be analyzed and compared are passed between the brushes 1 and 2 and then cooperating contact blocks 3 and 4 in succession in such a manner that brushes 2 rest on the field of one card in relatively the same position as brushes 1 rest on the corresponding field of the succeeding card. The passage of successive cards with identical perforations in corresponding columns beneath the upper and lower brushes permits both sets of brushes to make simultaneous contact with their cooperating contact blocks thereby closing a circuit connected with the current source 5, said circuit containing magnet $6^a$ or $6^b$. Each magnet $6^a$ and $6^b$ has coordinated thereto a pair of contacts $7^a$ and $7^b$ respectively, which on energization of the coordinated magnets are closed and kept closed by well known mechanical means, not shown in the drawing, until toward the end of the card cycle, when they are automatically opened. This is in conformity with the usual automatic group control in electrically controlled tabulating machines.

The contact pairs 7ª and 7ᵇ are positioned in series within a circuit which is likewise connected with the source of current 5, said circuit containing the usual cam contact 8 which during each cycle of the machine is closed by cam 9 after the passage of a set of brushes over the entire hole zone of the card but before they clear the card. The card group control circuits, wherein contacts 7ª and 7ᵇ are provided contain still another contact 10 which is under the control of a slide 11 which in turn is controlled by a magnet 12 likewise included in the card group control circuit. The control of the slide is effected by means of a pawl 13 which is adapted to engage a toothed rack 14 on the slide 11 and which is released on energization of the magnet 12, so that slide 11 then is adapted to follow the tension of spring 15. The effect of retracting slide 11 by spring 15 upon excitation of magnet 12 is to open contact 10. At the same time contact 16, being also under the influence of slide 11, is caused to open. The circuit containing contact 16 is coordinated to the card group control circuit and has the function of actuating a card sorting member 17 and may or may not, as desired, actuate a printing magnet 18. The slide 11, after each release of pawl 13 and retraction by spring 15 is returned to the position illustrated on the drawing by a step-by-step movement, such returning being effected by pawl 19 which on each revolution of cam 20 corresponding to the gyration of a card cycle is advanced one step towards that position which corresponds to the closure of contact 10, so that two cycles of the machine are required in order to return slide 11 after each release of pawl 13 into its original position.

The circuit wherein contact 16 is provided contains still a further contact 19ª which is controlled by a cam 20ª, which cam similar to cam 9 makes one revolution for each cycle of the machine, cam 20ª, however, being so displaced with relation to cam 9 that it closes its contact 19ª immediately after opening of contact 8 by cam 9 and that it opens contact 19ª again prior to the beginning of the sensing of the hole zone of the next card by the contact brushes.

The circuit in which contacts 16 and 19ª are provided contains a magnet 21 which is energized on closing of contact 19ª provided at the same time contact 16 is closed, that is to say, provided that slide 11 is in that position which is illustrated on the drawing. The excitation of magnet 21 produces attraction of its armature 22, such armature closing contact at 23 whereby a holding circuit from magnet 24 is closed, this being in consequence of the fact that during the short moment of closing contact 19ª a circuit is established through magnet 21 contacts 16 and 19ª and either through printing magnet 18 or switch 34, depending on whether said switch is open or closed, and through contacts 37 to source of supply 5. The holding circuit thus established by virtue of the magnet 21 attracting its armature 22 making a contact at 23, closes the circuit through magnets 25 and 24 and thence through magnet 18 or switch 34 as above disclosed. Magnet 25 being now energized momentarily attracts its armature 26 closing contact 27 thus establishing the holding circuit through contacts 28 and 27, magnets 25 and 24 and thence to the source of supply as previously explained. Magnet 25 remains energized as long as contacts 28 remain closed which contact is under the influence of cam 29 being kept closed by said cam during the period of passage of the card hole zone at the contact brush sets 1 and 2.

In shunt with contact 10 is a magnet 30 controlling contacts 31 which are in the circuit of the motor 32.

The embodiment of the machine described is adapted to examine cards with the view of determining which cards exist in pairs and which exist singly. At first the cards to be examined are sorted by a sorting machine of usual construction in such a manner that cards with alike punching are brought adjacent to each other. The sorted cards are then combined in a stack and placed in the card magazine of the machine so that on starting the machine the cards are transported in the usual manner in succession past the sets of contact brushes.

The operation of the device disclosed in the invention is as follows: Assuming the first two cards show alike punching, then on sensing the card holes by the two sets of brushes 1 and 2 a circuit is closed through the magnet coils 6ª and 6ᵇ thereby causing contacts 7ª and 7ᵇ to close. A circuit is thus completed as previously explained causing magnet 12 to act on pawl 13 releasing it from rack 14 on slide 11 permitting said slide to be retracted by spring 15 thereby opening contacts 10 and 16. Contact 16 now being open, the closing of contact 19ª does not affect magnet 24 which remains deenergized. Consequently the first card, which shows the same punching as the second, is so guided by sorting element 17 that it is moved to the left side of the wall 33. Assuming now that the third card is provided with a punching different from that of the second card, then the circuit containing contacts 7ª and 7ᵇ is not closed, at least one of the two contacts remaining open. At the passage of the third card past the set of brushes 1 slide 11 is moved back one step by pawl 19. Contact 16 therefore remains open and magnet 24 consequently remains in its unenergized state allowing card sorter element 17 to remain unchanged thus the second card is likewise moved to the left of the wall 33 it having the same punching as the first.

Assuming now that the fourth card has identical punchings with the third card, the brush sets 1 and 2 sensing again a like pair cause contacts 7ª and 7ᵇ to be simultaneously closed. After the passage of the third card past contact brush set 2 slide 11 makes its second back step closing contact 10 in consequence thereof. As previously stated, contacts 7ª and 7ᵇ are held closed by mechanical means during the passage of the card and cam 9 causes contact 8 to close immediately after contact 10 has been closed by the action slide 11. The contact 8 therefore closes the circuit again ep gizing magnet 12 with the effect that slide 11 is again retracted by spring 15 and opening contacts 16 and 10 in consequence whereof the magnet 24 still remains deenergized leaving sorter element 17 unchanged and causing the third card to be moved to the left of wall 33.

Assuming on the contrary that the fourth card was not provided with the same punching as the third card, the two contacts 7ª and 7ᵇ would not have been closed simultaneously and although the slide 11 having returned to the position shown in the drawing would close contacts 10 and 16 the magnet 12 would not be energized thus causing the slide to remain in that position. Inasmuch as contact 16 now remains closed the closing of contact 19ª by the cam 20ª causes magnet 24 to become energized, as previously explained, which in turn causes sorter element 17 to become displaced. In this case, therefore, the third card will be guided to the right of the wall 33 from whence the single cards are removed and not to the left which is the placement for those cards existing in pairs.

Assume now that three cards following in succession are provided with the same punching, that is assume that the first, second and third cards are punched in the same manner. At the end of the passage of the second and third cards contacts 7ª and 7ᵇ will still remain closed. Contact 10, however, is open inasmuch as slide 11 has made but one backward step towards its original position. Consequently on closing contact 8 a circuit is closed through magnet 30 attracting its armature 35 and causing contact 31 to open thereby interrupting the motor circuit thus stopping motor 32.

In the above explanation of the operation of the machine consideration has been given only to the operation of the sorter element 17. A printing magnet 18 may be provided with such a machine and such a magnet 18 as shown in the drawing would comply in exact conformity to magnet 24 provided the shunt circuit switch 34 is opened. Closing switch 34 will prevent the operation of printing magnet 18. In a similar manner it would be possible to provide a shunt switch for magnet 24 the closure of which would render said magnet inoperative. The above arrangement of the printing magnet 18 is intended for the recording of the single cards but if it should be desired to record those cards which are provided in pairs, then magnet 18 should be positioned in the circuit containing contacts 7ª, 7ᵇ, 10 and 8.

Relating to the operation of printing magnet 18 it may be noted that in providing a normal tabulating machine with group control, with the arrangement above described, printing magnet 18 has the effect of releasing the printing hammers which are normally locked. Therefore, printing of items takes place only to such extent as the printing hammers are released by the actuation of the printing magnet.

Having described my invention what I claim and desire to secure by Letters Patent is:

1. A record controlled machine including means for automatically comparing data designations on successive controlling records and means controlled by said first named means for sorting the records according to like and unlike data designations on successive records.

2. A record controlled machine including means for automatically comparing data designations on successive controlling records and means controlled by said first named means for sorting the records according to groups determined by like and unlike data designations on successive records.

3. A record controlled machine comprising means for separating records groups consisting of a predetermined number of successive records having like data designations thereon from record groups consisting of other than the predetermined number said means including means for comparing data designations on successive records and means controlled by said last named means for separating groups of records consisting of the predetermined number from groups consisting of other than the predetermined number.

4. A record controlled machine comprising record analyzing means and means associated therewith for comparing data designations on successive records, a device normally set for a predetermined mode of operation and means controlled by said analyzing means for shifting said device for an alternative mode of operation on passage of a card group past the analyzing means consisting of less than a predetermined number of successive records with like data designations.

5. A record controlled machine comprising record analyzing means and means associated therewith for comparing data designations on successive records and means controlled by said analyzing means for interrupting machine operation on the passage of a group of successive records consisting of more than a predetermined number having like data designations.

6. A record controlled machine comprising record analyzing means and means associated therewith for comparing data designations on successive records, a device normally set for a predetermined mode of operation, means controlled by said analyzing means for shifting said device for an alternative mode of operation on passage of a record group past the analyzing means consisting of less than a predetermined number of successive records with like data designations and for interrupting machine operation on the passage of a group consisting of more than the predetermined number of records with like data designations.

7. A cyclically operable record controlled machine comprising record analyzing means and means controlled thereby for comparing data designations on successive records, a step-by-step device with means for urging it to an inoperative position and machine operated means for advancing it one step each cycle, means operated by said device after a predetermined number of steps for shifting a record responsive device to an alternative mode of operation and means controlled by said comparing means for releasing said step-by-step device upon passage of records bearing like data designations past the analyzing mechanism.

8. A cyclically operable record controlled machine comprising record analyzing means and means controlled thereby for comparing data designations on controlling records, a device for manifesting data designations on the records and electrically operated means for selectively determining one of a plurality of modes of operation therefor, a control circuit for said electrically operated means including normally open controlling contacts, a step-by-step element for closing said contacts after a predetermined number of steps and means for urging said element to inoperative position, machine operated means for advancing said element one step each cycle, and means controlled by said comparing means for releasing said step-by-step element upon passage of successive records bearing like data designations past the analyzing mechanism.

In testimony whereof I hereto affix my signature.

HERMANN ADALBERT WEINLICH.